(No Model.)
M. E. ZELLER.
THILL COUPLING.
No. 273,791. Patented Mar. 13, 1883.
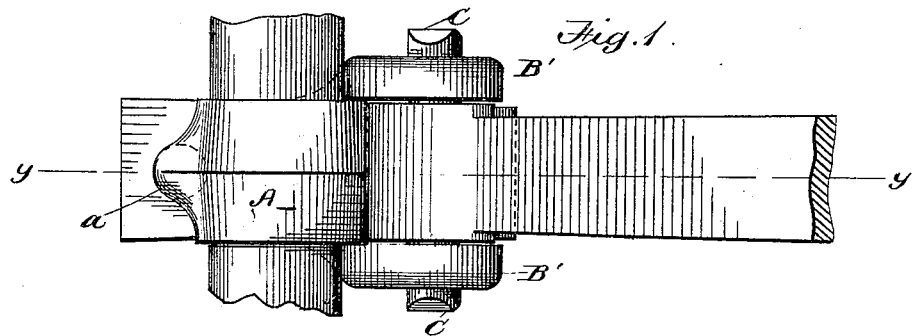
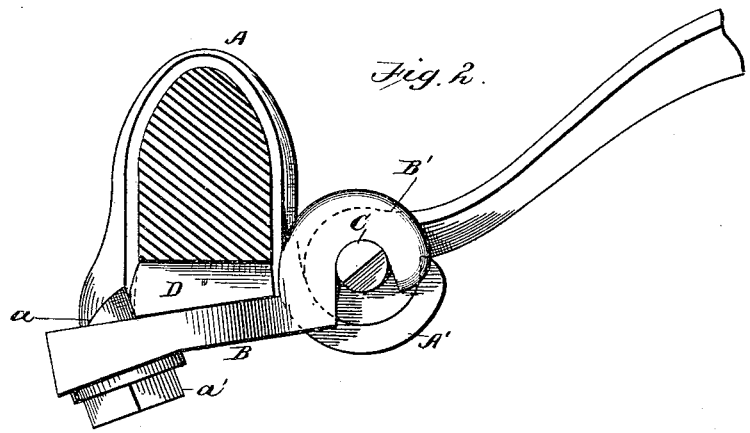
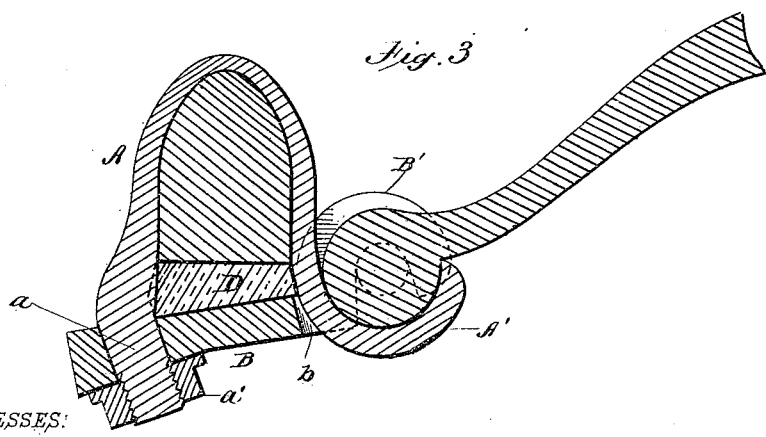
WITNESSES:
W. H. H. Knight
Harry Bernhard
INVENTOR.
Melancthon E. Zeller
per Edson Bros,
Attorneys

UNITED STATES PATENT OFFICE.

MELANCTHON E. ZELLER, OF BLUFFTON, ASSIGNOR OF ONE-HALF TO JOHN J. ZELLER, OF OTTAWA, OHIO.

THILL-COUPLING.

SPECIFICATION forming part of Letters Patent No. 273,791, dated March 13, 1883.

Application filed January 8, 1883. (No model.)

*To all whom it may concern:*

Be it known that I, MELANCTHON E. ZELLER, a citizen of the United States, residing at Bluffton, in the county of Allen and State of Ohio, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in thill-couplings, having for its object to enable the ready coupling and uncoupling of the thill, and to prevent the rattling noise usually experienced at the point of articulation, and the sudden falling of the thills to the ground when released from the hand in unhitching the horse or animal; and it consists of a clip which fits over the axle, with one side carried through and bolted to an apertured plate formed with hooks opening downward, a block of rubber or elastic material being interposed between said plate and the axle, and with its forward or opposite side carried down through the forward part of the hooked plate, and provided with a hook opening upward, forming, with the hooks of the plate, an eye which receives the pintle or axis of the thills, substantially as hereinafter more fully set forth.

In the accompanying drawings, Figure 1 is a plan view of my improved thill-coupling. Fig. 2 is a side view thereof, and Fig. 3 is a section of the same on the line *y y* of Fig. 1.

In carrying out my invention I employ a clip, A, which fits over the axle, with one side extended downward, as at *a*, through an apertured plate, B, arranged at a point below the axle, said downward extension *a* being provided with a screw-thread, upon which is fitted a nut, *a'*, to secure it to the said plate. The front or opposite side of the clip is carried downward through a slot or aperture, *b*, in the front part of said plate, and formed into a hook, A', opening or facing upward. The forward end of the plate B is formed with two hooks, B', opening or facing downward, and constituting, with the intermediately-disposed hook A' of the clip, an eye which receives and forms a bearing for the thill pintle or pin C. A block or cushion of rubber, D, or other elastic material, is sandwiched between the under side of the axle and the plate B. Said cushion or spring has an approximately wedge shape, to deflect the plate downward and rearward, whereby by screwing home the nut *a'* pressure will be brought upon and cause the hooks of the plate to securely hold the thill pintle or bolt in the hook of the clip, and at the same time keep the said pintle tight and prevent the thills from rattling and falling suddenly to the ground in unhitching the horse from the vehicle.

Though I preferably cast the thill pintle or pivot in one with the thill-iron, it may be connected removably thereto, if desired.

I claim and desire to secure by Letters Patent—

1. In a thill-coupling, the clip having one side provided with a downward screw-threaded extension and its other side provided with a hook opening or facing upward, in combination with the apertured or slotted plate provided with hooks facing downward, the front side of the thill being inserted in the slot of said plate, and the approximately wedge-shaped rubber block interposed between the under side of the axle and the plate, substantially as and for the purpose set forth.

2. In a thill-coupling, the combination, with the axle, clip with one side provided at its lower end with an upwardly-facing hook, and the thill having at its inner end a pintle or pin, of the bottom plate adapted to be connected to the rear side of said clip, and provided with a slot near its front end and a downwardly-facing hook, substantially as and for the purpose set forth.

In testimony whereof I affix my signature in presence of two witnesses.

MELANCTHON E. ZELLER.

Witnesses:
JAMES L. DOTY,
H. N. CRONINGER.